(12) United States Patent
Hausauer et al.

(10) Patent No.: US 11,651,092 B2
(45) Date of Patent: May 16, 2023

(54) TECHNIQUES TO PROVIDE CLIENT-SIDE SECURITY FOR STORAGE OF DATA IN A NETWORK ENVIRONMENT

(71) Applicant: INTEL CORPORATION, Santa Clara, CA (US)

(72) Inventors: Brian S. Hausauer, Austin, TX (US); Lokpraveen B. Mosur, Gilbert, AZ (US); Tony Hurson, Austin, TX (US); Patrick Fleming, Laois (IE); Adrian R. Pearson, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 104 days.

(21) Appl. No.: 17/237,102

(22) Filed: Apr. 22, 2021

(65) Prior Publication Data
US 2021/0264042 A1 Aug. 26, 2021

Related U.S. Application Data

(63) Continuation of application No. 15/721,769, filed on Sep. 30, 2017, now Pat. No. 11,042,657.

(51) Int. Cl.
| | |
|---|---|
| *G06F 21/62* | (2013.01) |
| *H04L 9/40* | (2022.01) |
| *G06F 21/78* | (2013.01) |
| *H04L 9/32* | (2006.01) |
| *H04L 9/08* | (2006.01) |
| *H04L 67/1097* | (2022.01) |
| *G06F 16/13* | (2019.01) |

(52) U.S. Cl.
CPC .............. *G06F 21/62* (2013.01); *G06F 21/78* (2013.01); *H04L 9/0891* (2013.01); *H04L 9/0894* (2013.01); *H04L 9/3242* (2013.01); *H04L 63/0428* (2013.01); *H04L 63/06* (2013.01); *H04L 63/08* (2013.01); *H04L 63/10* (2013.01); *G06F 16/13* (2019.01); *G06F 2221/2107* (2013.01); *H04L 9/3213* (2013.01); *H04L 67/1097* (2013.01)

(58) Field of Classification Search
CPC .......... G06F 21/62; G06F 21/78; G06F 16/13; G06F 2221/2107; H04L 9/0891; H04L 9/0894; H04L 9/3242; H04L 63/0428; H04L 63/06; H04L 63/08; H04L 63/10; H04L 9/3213; H04L 67/1097
See application file for complete search history.

(56) References Cited

U.S. PATENT DOCUMENTS

| | | | |
|---|---|---|---|
| 7,971,236 B1 * | 6/2011 | Lentini | .................. H04L 63/08 726/6 |
| 10,083,131 B2 * | 9/2018 | Inamdar | .................. G06F 12/14 |

(Continued)

*Primary Examiner* — J. Brant Murphy
(74) *Attorney, Agent, or Firm* — KDB Firm PLLC

(57) ABSTRACT

Various embodiments are generally directed to an apparatus, method and other techniques to determine a secure memory region for a transaction, the secure memory region associated with a security association context to perform one or more of an encryption/decryption operation and an authentication operation for the transaction, perform one or more of the encryption/decryption operation and the authentication operation for the transaction based on the security association context, and cause communication of the transaction.

20 Claims, 14 Drawing Sheets

(56) References Cited

U.S. PATENT DOCUMENTS

| | | | | |
|---|---|---|---|---|
| 2006/0230119 A1* | 10/2006 | Hausauer | ............ | H04L 67/1097 709/216 |
| 2007/0160211 A1* | 7/2007 | Bakshi | .................. | H04L 63/068 380/247 |
| 2007/0165858 A1* | 7/2007 | Bakshi | .................... | H04L 9/321 380/247 |
| 2010/0211507 A1* | 8/2010 | Aabye | .................... | G06Q 20/40 705/64 |
| 2013/0060647 A1* | 3/2013 | Aabye | .................... | G06Q 20/10 705/16 |
| 2015/0088756 A1* | 3/2015 | Makhotin | ............ | G06Q 20/326 705/71 |
| 2017/0103225 A1* | 4/2017 | Pearson | ............. | G06F 21/6218 |

* cited by examiner

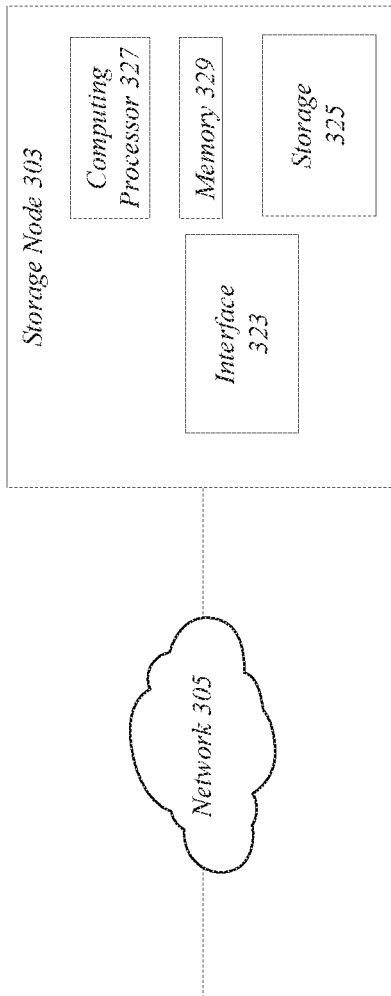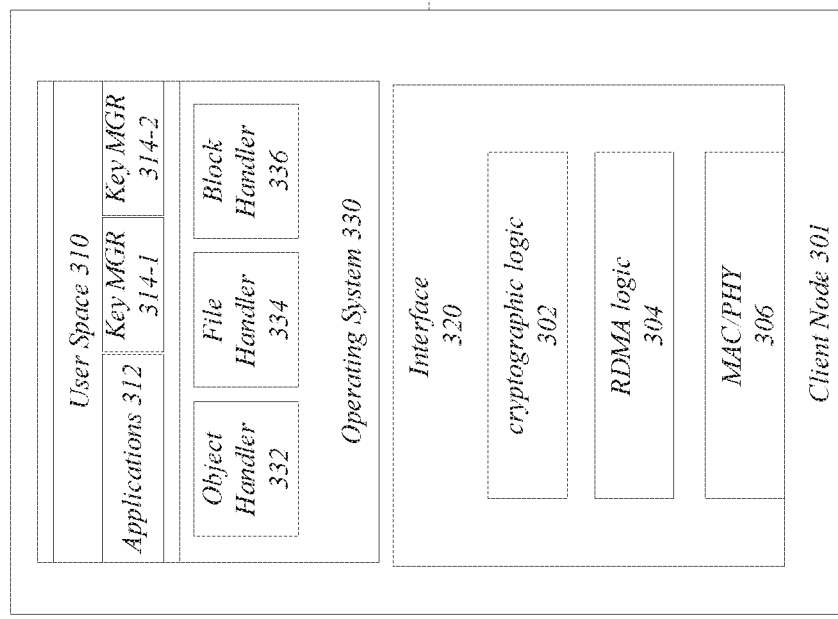
FIG. 3A

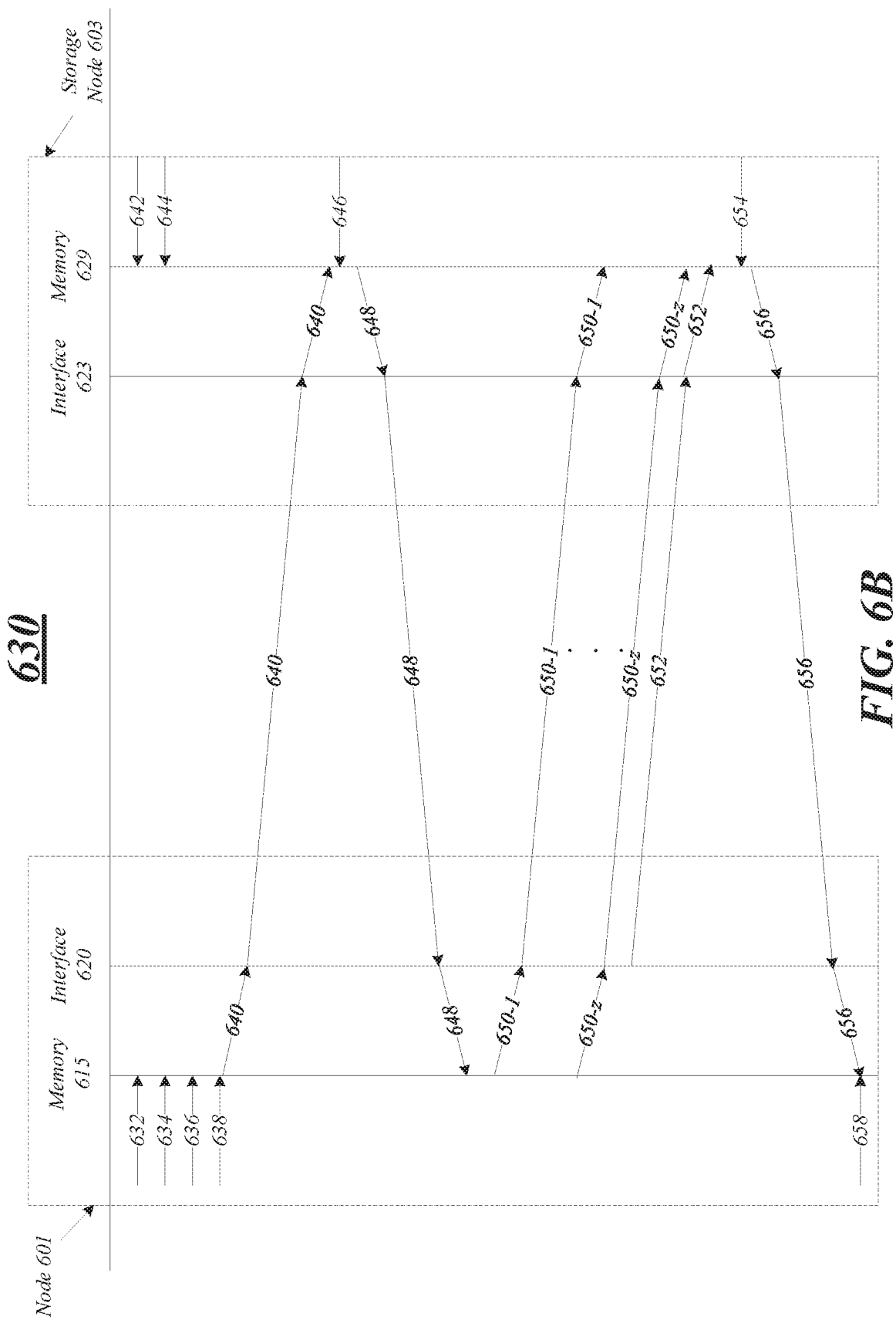

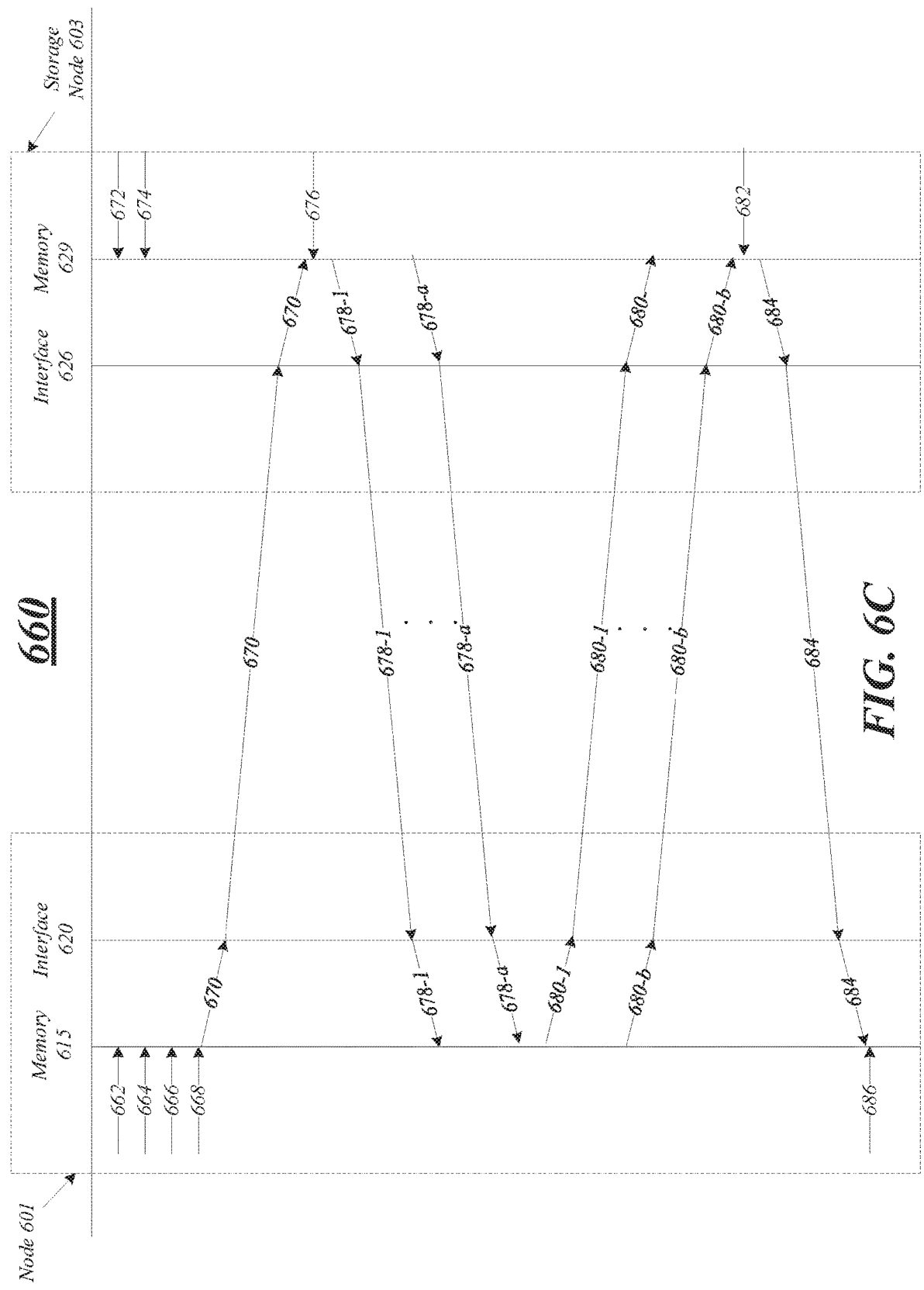

700

```
┌─────────────────────────────────────────────────┐
│   DETERMINE A SECURE MEMORY REGION FOR A        │
│ TRANSACTION, THE SECURE MEMORY REGION ASSOCIATED│
│ WITH A SECURITY CONTEXT TO PERFORM ONE OR MORE OF│
│   A CRYPTOGRAPHIC OPERATION AND AN AUTHENTICATION│
│         OPERATION FOR THE TRANSACTION           │
│                     705                         │
└─────────────────────────────────────────────────┘
                        │
┌─────────────────────────────────────────────────┐
│    PERFORM ONE OR MORE OF THE ENCRYPTION/       │
│  DECRYPTION OPERATION AND THE AUTHENTICATION    │
│   OPERATION FOR THE TRANSACTION BASED ON THE    │
│         SECURITY ASSOCIATION CONTEXT            │
│                     710                         │
└─────────────────────────────────────────────────┘
                        │
┌─────────────────────────────────────────────────┐
│                                                 │
│        CAUSE COMMUNICATION OF THE TRANSACTION   │
│                     715                         │
│                                                 │
└─────────────────────────────────────────────────┘
```

*FIG. 7*

TECHNIQUES TO PROVIDE CLIENT-SIDE SECURITY FOR STORAGE OF DATA IN A NETWORK ENVIRONMENT

CROSS-REFERENCE TO RELATED APPLICATIONS

This application is a continuation of, claims the benefit of and priority to previously filed U.S. patent application Ser. No. 15/721,769 filed Sep. 30, 2017, entitled "TECHNIQUES TO PROVIDE CLIENT-SIDE SECURITY FOR STORAGE OF DATA IN A NETWORK ENVIRONMENT", which is hereby incorporated by reference in its entirety.

TECHNICAL FIELD

Embodiments described herein generally include techniques to provide client-side security for storage of data in a network environment, wherein the storage of the data occurs on a remote storage node.

BACKGROUND

Today's existing network storage data protection methods vary widely. For example, for all three storage types, block storage, object storage, and file storage, different approaches are utilized to perform data protection. Typically, a combination of industry standard security protocols are used, such as one for data transfer, confined to the network, and one for data at rest, on storage devices. To date, no industry standards exist to protect both storage data in-flight, that is, on the network, and at rest, persistent on the disk. Instead, IT administrators resort to a combination of a secure network protocol and a disk-centric data-at-rest cryptographic protocol.

BRIEF DESCRIPTION OF THE DRAWINGS

FIGS. 6A-6C illustrates examples of processing flows to put data.

FIG. 7 illustrates an example of a second logic flow.

DETAILED DESCRIPTION

Figure 1:
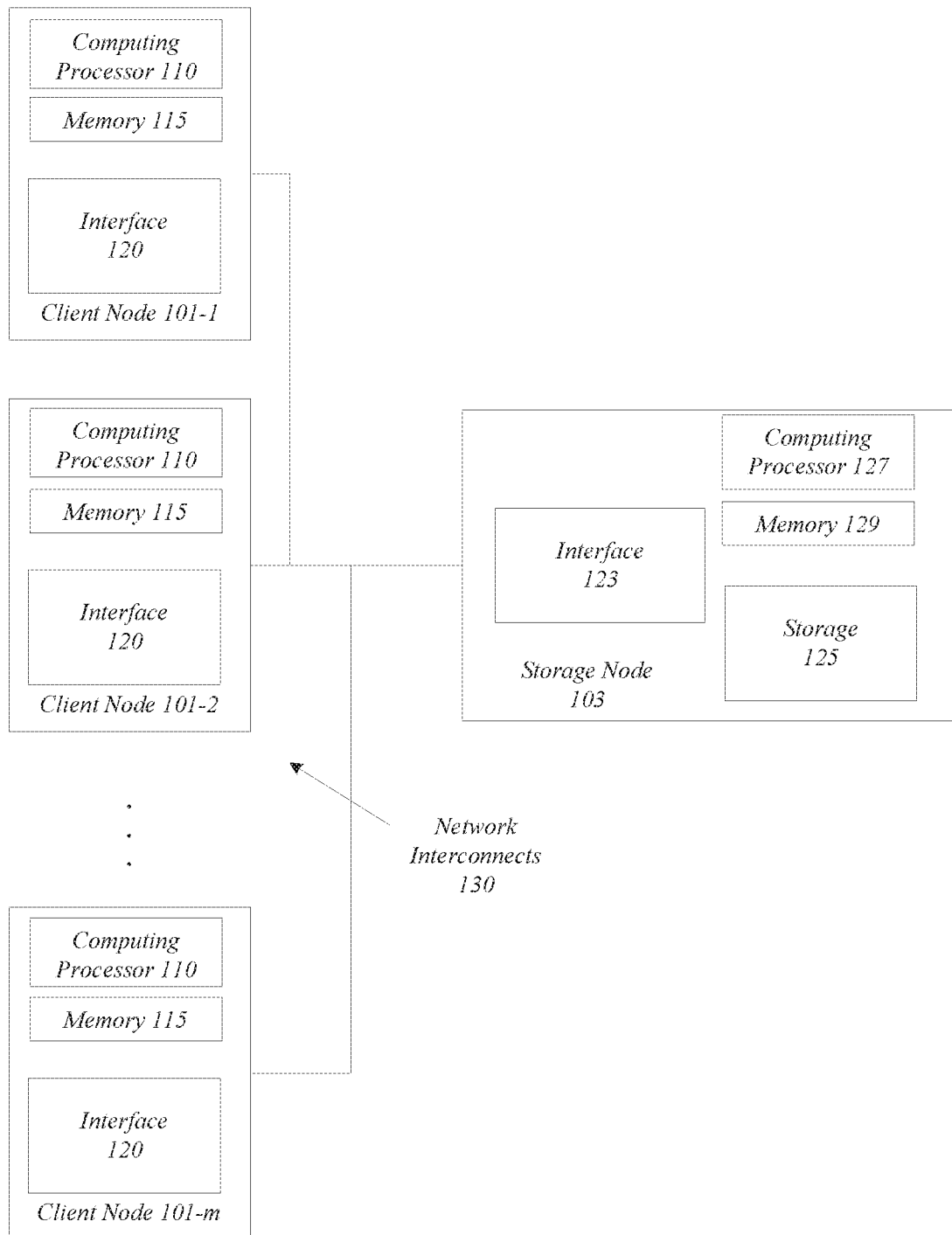
FIG. 1 illustrates an example of a first system.

Embodiments discussed may relate to performing client-side cryptographic operations, such as encryption/decryption and authentication for data store remotely, on a remote storage node, for example. As will be discussed in more detail below, embodiments include circuitry using a security association context associated with a secure memory region to process a transaction and perform the cryptographic operations. In one example, the interface circuitry may determine a secure memory region for a transaction based on information received from an operating system or application. The secure memory region is associated with the security association context to perform one or more of the encryption/decryption operation and the authentication operation for the transaction. More specifically, the secure memory region includes a security association context index and a starting nonce, the security association context table is used to locate a security association context for the transaction. The security association context includes information to encrypt/decrypt information and perform authentication, such as keys, cryptographic settings, and so forth, as will be discussed in more detail.

Embodiments include performing one or more of an encryption/decryption operation and the authentication operation for the transaction based on the security association context. In embodiments, the encryption/decryption operation and the authentication operation may be performed at the client-side, e.g. a client node, and may be based on the type of transaction and the cryptographic operations indicated in the security association context for the data associated with the transaction. For example, a write (put) transaction may require encrypting information in one or more packets based on the security association context. If authentication is indicated, a message authentication code (MAC) may also be created for the information for storage on a remote device. In another example, a read (get) transaction may require decryption of information received from a remote storage based on the security association context. Further, authentication on the information may be performed utilizing MAC information received with the information. Embodiments may also include causing communication of the transaction. For example, if the transaction is a write transaction, information may be communicated to a remote storage node for storage. In another example, if the transaction is a read transaction, the information may be provided to other elements of the client node, such as memory for use by an application requesting the information. The transaction may not be performed until the encryption/decryption operation and/or the authentication operation have completed. Embodiments are not limited in this manner and further details be discussed in the following description.

Reference is now made to the drawings, wherein like reference numerals are used to refer to like elements throughout. In the following description, for purposes of explanation, numerous specific details are set forth to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an example embodiment of a system 100 in which aspects of the present disclosure may be employed to control remote direct memory access and provide client-side security for data stored in a remote device or node, such as a remote storage node 103.

The system 100 may include a number of client nodes 101-1 through **101-*m*, where m may be any positive integer, each may include resources such as a computing processor 110, a memory 115, and an interface 120. Note that embodiments are not limited in this manner, and the client nodes 101 may include other elements, resources, circuitry, and so forth to process information and data. The client nodes 101 may be coupled via one or more network interconnects 130 which may include fabric and Ethernet links, or other fabric links to communicate information between the client nodes 101 and with storage node 103. The one or more network interconnects may include switches and interconnects and may communicate information and data between the client nodes 101 and the storage node 103** electrically and optically, for example. However, embodiments are not limited in this manner. For example, embodiments may include more than one storage node 103.

In some embodiments, the system 100 may be a cloud-computing environment, enterprise environment, datacenter environment, virtualization environment, and combination thereof. For example, each of the client nodes 101 may provide processing and storage capabilities to a number of users, which may be different from each other. Each of the users may be provided their own operating environment (guest operating system) in a virtualized manner, for example. The system 100 may include a storage node 103 (or a number of storage nodes/devices) capable of storing information and data for users in a persistent manner even when a particular user is not utilizing a client node 101. More specifically, the storage node 103 may provide storing, and access to data and information to any number of client nodes 101 via one or more network interconnects.

In various embodiments, each of the client nodes 101 may be embodied as any type of computing device, including a personal computing, a desktop computer, a tablet computer, a netbook computer, a notebook computer, a laptop computer, a server, server farm, blade server, or any other type of server, and so forth. In some embodiments, the client nodes 101 may include memory 115 and a computing processor 110 having one or more cores. Embodiments are not limited in this manner. In some instances, the client nodes 101 may include other resources, such as storage resources, which may include persistent memory to store data and information.

In embodiments, the memory 115 may be one or more of volatile memory including random access memory (RAM) dynamic RAM (DRAM), static RAM (SRAM), double data rate synchronous dynamic RAM (DDR SDRAM), SDRAM, DDR1 SDRAM, DDR2 SDRAM, SSD3 SDRAM, single data rate SDRAM (SDR SDRAM), and so forth.

Embodiments are not limited in this manner, and other memory types may be contemplated and be consistent with embodiments discussed herein. For example, the memory 105 may be a three-dimensional crosspoint memory device, or other byte addressable write-in-place nonvolatile memory devices. In embodiments, the memory devices may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory based device, a magnetic tunneling junction (MTJ) based device, a DW (Domain Wall) and SOT (Spin-Orbit Transfer) based device, a thyristor-based memory device, or a combination of any of the above, or other memory.

In some embodiments, the client node 101 may include one or more computing processors 110 which each may include one or more cores and processing circuitry to process information for the client nodes 101. The computing processor 110 may be one or more of any type of computational element, such as but not limited to, a microprocessor, a processor, central processing unit (CPU), digital signal processing unit, dual-core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. In some embodiments, the computing processor 110 may be connected to and communicate with the other elements of the computing system via one or more interconnects, such as one or more buses, control lines, and data lines.

In embodiments, the computing processor 110 includes cores and elements to read and write data in memory, such as memory 115 In some instances, a computing processor 110 may read/write data in memory which is co-located within the same node 101. In other instances, the computing processor 110 may read/write data in memory and storage in a different node 101 and storage node 103, via a remote direct memory access (RDMA) mechanism, for example. Embodiments discussed here will be in reference to a client node 101 storing data and information in a storage node 103 utilizing RDMA. The data and information may be communicated and stored in blocks, files, and objects. Thus, storage node 103 may be one or more block-based, file-based, and/or object-based network storage variant.

In some instances, a client node 101 and computing processor 110 storing information and data on storage node 103 may require one or more security measures to be implemented to ensure data security and/or authenticity. Current protection methods for enterprise and datacenter networked storage data vary widely. In one example a combination of industry standard security protocols is utilized, one for data transfer (in-flight), confined to the network, and one for data at rest, on storage devices. To date, no industry standards exist to protect both storage data in-flight (that is, on the network) and at rest (persistent on the disk). Embodiments discussed herein provide a client-centric, hardware-offloaded, tenant-managed, security scheme encompassing data-at-rest privacy and authentication/integrity and data-in-flight privacy. Embodiments also include an option for tenant-based key management in multi-tenant datacenters. Further, the security mechanism may utilize a hardware-based inline crypto-plus-RDMA combination for low-latency, secure data transfers, and storage.

In embodiments, a client node 101 includes an interface 120 to communicate information and data with other client nodes 101 and storage nodes 103. In one example, a client node 101 may read and write information to a storage node 103 and storage 125 using RDMA. RDMA is well suited to networked storage data transfer because of its low-latency hardware-offloaded network stack, avoidance of receive data copies through page-aligned data placement of receive application data, and the option of direct user-mode access to the interface 120, such as an RDMA Network Interface Card (RNIC) or NIC. As a result, storage applications running over RDMA achieve significantly lower latency and host computing processor utilization compared with conventional, kernel-software-based TCP/IP stacks. As will be discussed in more detail in FIG. 2, the interface 120 may provide the security mechanism to perform client-side security operations.

Figure 2A:
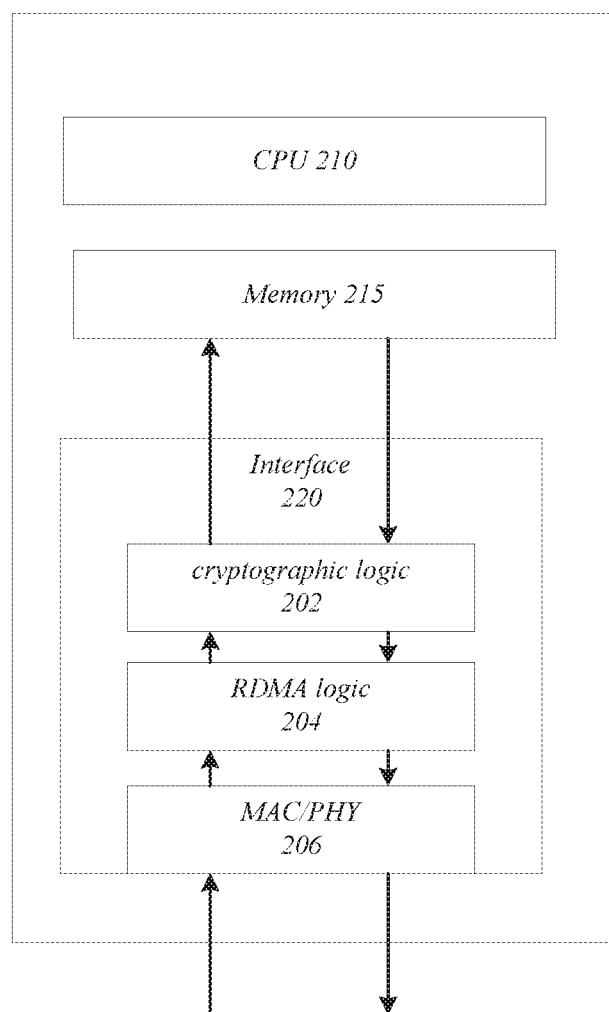
FIGS. 2A/2B illustrates an example of a node.

FIG. 2A/2B illustrates an example of a client node 201, which may be similar to or the same as any one of the nodes discussed concerning system 100. The node 201 includes a computing processor 210, memory 215, and an interface 220. The interface 220, such as a network interface component or device, may include additional elements to provide security mechanisms for data and information stored on a storage node. More specifically, the interface 220 may include interface circuitry to process one or more instruction. The interface 220 may include cryptographic logic 202, RDMA logic 204, and MAC/PHY circuitry 206. The cryptographic logic 202 and the RDMA logic 204 may at least be partially implemented in the interface circuitry to process one or more instructions stored in memory, such as firmware, storage, and/or non-volatile memory.

Figure 2B:
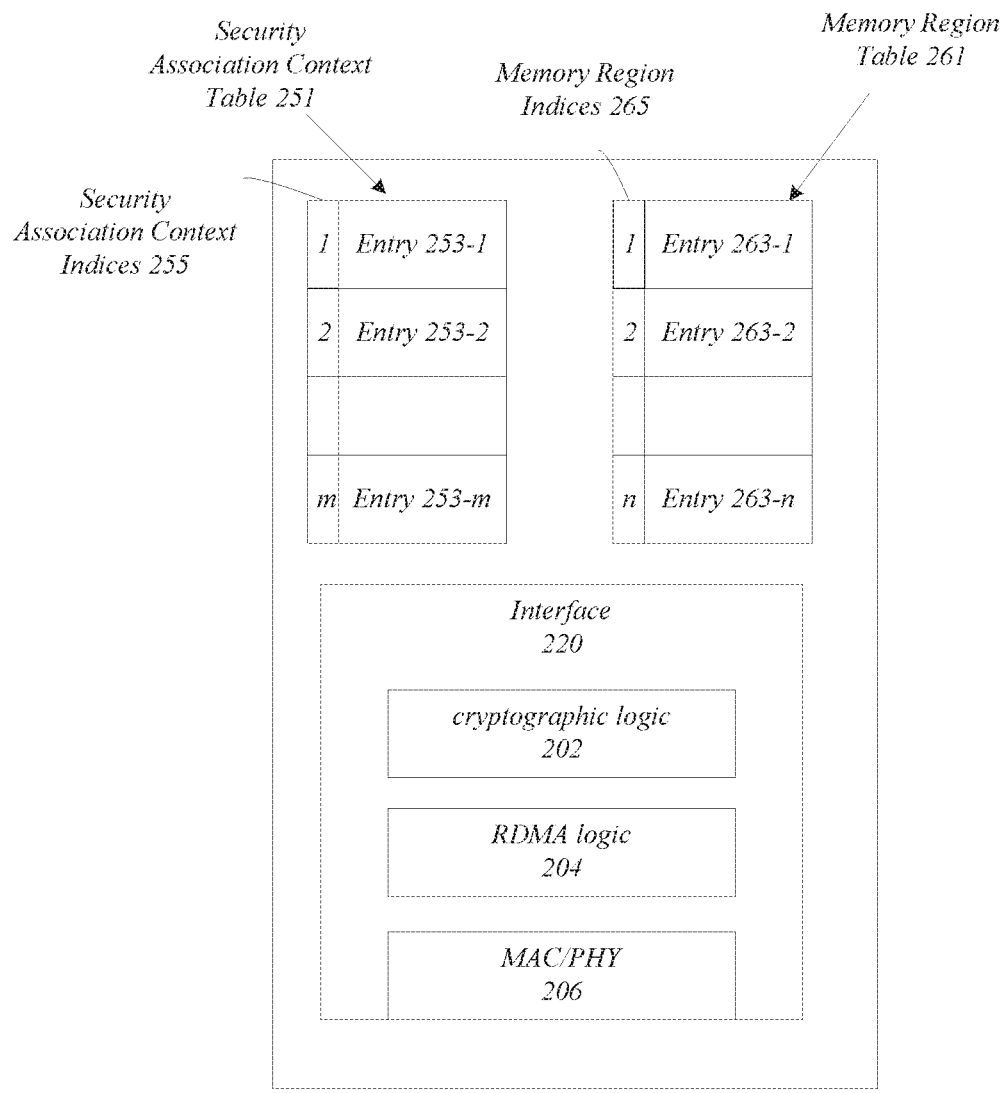

FIG. 2B illustrates the node 201 including a security association context table 251 and a memory region table 261. The security association context table 251 include any number of entries 253-m (security association context table entries), where in is any positive integer. Each of the entries 253 is associated and is referenced by a security association context index 255 value and includes a security association context specifying a cryptographic type and a secure data key.

Similarly, the memory region table 261 also include entries 263-n (memory region entries), where n is any positive integer. Each of the entries 263 is associated with a different secure memory region and includes information for data stored in the associated secure memory region. For example, an entry includes a buffer starting address, length, associated page list, access control flags, a security association context index, a starting nonce, and associated valid bits. Each of the entries 263 are reference by memory region index value that is included in a request from an operating system or application.

The interface 220 including the cryptographic logic 202 and the RDMA logic 204 provides the cryptographic security, including in-flight and at-rest protection, utilizing the cryptographic logic 202 at the Upper Layer Protocol (ULP) layer, above the RDMA logic 204 transport layer. Thus, at least a portion of the cryptographic logic 202 and RDMA logic 204 may be implemented at the ULP, above the transport layer. Utilization of RDMA by the interface 220 to communicate data enables further hardware offload of ULPs, e.g. the cryptographic logic 202 and the RDMA logic 204, in the networking stack because its application data memory regions are clearly delineated, with each memory region having its own properties. Attaching per-tenant, per-user or per-application security associations to memory regions allows the interface 220 (RNIC) to direct inbound and outbound data to the cryptographic logic 202, e.g. an inline crypto engine, to encrypt/decrypt and/or authenticate/sign the data. As will be discussed in more detail, one or two security associations (for encryption and/or authentication/integrity) may be attached to a memory region. The association of a security association to a memory region rather than a networked connection (Queue Pair) is useful in multi-tenant environments where the service provider manages tenant keys, and different tenants may be running virtual machines (VMs) on the same physical server or node over a single Queue Pair. Embodiments are not limited to multi-tenant environments and client-side encryption features discussed herein are also applicable in a bare-metal (no virtualization/hypervisor) environment.

In embodiments, the cryptographic logic 202 may perform encryption and decryption operations for data sent to and received from a remote storage device, e.g. a storage node coupled via one or more network interconnects. The cryptographic logic 202 may also perform authentication operations for data stored in remote storage.

In one example, to process an incoming data packet, the interface 220 receives the data packet at the MAC/PHY layer 206. The received data may be encrypted and/or received with authentication information, e.g. message authentication code (MAC), signature, a hash or partial hash value. Note that the data may have been encrypted by the client node 201 or a different client utilized by a user when the data was sent to and stored in the remote storage. The received data packet may have been sent from a storage node in response to an input/output operation (IOP), e.g. a transaction request, to get data from remote storage. The IOP may be generated at the client node 201 and cause the remote storage to send one or more RDMA messages (writes).

In embodiments, the RDMA logic 204 may receive the data or an indication of the received data. The RDMA logic 204 may determine a security association context related to the data and packet based on the IOPs request for the data, which may include a memory region index value, such as a STag or a R_Key, to perform a look up in a memory region table, and determine a security association context index. The RDMA logic 204 uses the memory region index value (STag or R_Key) to look up and determine a security association context index, which is used to determine security association context in a security association context table. The RDMA logic 204 may access the client node's host buffers' data memory region(s) context and determine the memory region(s) are secure memory region(s) with attached security association context(s), for example. A secure memory region may be an RDMA memory region and associated with the memory region table including the active/valid security association context index and a starting nonce to perform a cryptographic operation. The security association context index is used to determine the security association context in a security association context table. Each security association context may indicate protocol information including a cryptographic protocol type for associated data, and secure key information, e.g., a key used for cryptographic operations by the cryptographic logic 202.

The RDMA logic 204 may append the security association context index to each RDMA request communicated to host memory, such as memory 215. The cryptographic logic 202 may intercept these RDMA requests, steering the packet data to the cryptographic logic 202 itself. The cryptographic logic 202 may apply cryptographic processing, e.g. decryption for received encrypted data and/or verification of message authentication code, the hash value(s), or partial hash value. More specifically, the cryptographic logic 202 may utilize the appended security association context index to perform a lookup in the security association context table to determine an associated entry. The entry includes a cryptographic protocol, and the secret data key for the data to perform the cryptographic processing. For received data, the cryptographic logic 202 may send or push the processed data, e.g. plaintext data, to the host memory, e.g. memory 215. The cryptographic logic 202 also returns a completion/status descriptor to the RDMA logic 204. The RDMA logic 204 holds up subsequent RNIC completions/interrupts to host memory on the same Queue Pair (QP) until the receive data plaintext is written to host memory. This avoids a race hazard between the cryptographic logic 202 writing plaintext data to host memory and the storage software stack being informed by the RNIC that the IOP is complete.

In another example flow to process an outgoing data packet, the interface 220 including the RDMA logic 204 receives a data request, e.g. an IOP request. The IOP request may have been generated based on an application running in an operating system or virtual operating environment and include a memory region index value for a memory region table. The RDMA logic 204 uses the memory region index value, such as a STag or a R_Key, to perform a look up in a memory region table and determine an entry corresponding with the memory region index value. The entry includes information, such as, a buffer starting address, length, associated page list, access control flags, a security association context index, a starting nonce, and associated valid bits. The RDMA logic 204 uses the memory region index value (STag or R_Key) to look up and determine the security association context index in the entry, which is used to determine security association context in a security association context table. More specifically, the security association context index is used to determine an entry in the security association context table including a cryptographic type and a secret data key used to perform cryptographic operations for the data.

The RDMA logic 204 may append the security association context index to the RDMA requests communicated to host memory, such as memory 215. The cryptographic logic 202 may intercept these RDMA requests, steering the packet data to the cryptographic logic 202 itself. The cryptographic logic 202 may apply cryptographic processing, e.g. encryption and/or generating message authentication code, such as a hash or signature. More specifically, the cryptographic logic 202 may utilize the appended security association context index to perform lookup and determine an entry, e.g. a security association context. The entry includes cryptographic protocol, and the secret data key for the data to perform the cryptographic processing. In one example, the cryptographic logic 202 may encrypt data using the cryptographic protocol, secret data key, and starting nonce (from memory region table). For data to be written or put in remote storage, the cryptographic logic 202 may send or push the processed data, e.g. encrypted data and message authentication code, to the RDMA logic 204 and MAC/PHY 206 for communication to the remote storage. The cryptographic logic 202 also returns a completion/status descriptor to the RDMA logic 204.

FIG. 3A illustrates an example operating environment 300 including a client node 301 coupled with a storage node 303 via a network 305 including one or more network interconnects. In the illustrated example, the client node 301 may be a "bare-metal" node and does not include a virtual environment. The client node 301 may include an operating system 330, which may be stored in the storage and/or memory, and provide system software to manage computer hardware (memory, computing processor, interfaces, connected devices, and so forth) and software resources and provide common services for computer programs, such as applications 312. For example, the operating system 330 may manage and provide services to enable applications 312 to read and write data to the storage node 303.

In embodiments, the operating system 330 may enable block-based, file-based, and object-based networked storage variants for applications 312. For example, the operating system 330 may include an object handler 332 to provide storage services for applications 312 utilizing networked object-based storage. Object-based storage is accessed as whole objects. Thus, it is quite practical from a storage overhead perspective to generate one message authentication code (MAC), e.g. signature and a hash value, per object and store it alongside data on a target disk of the remote storage. A hardware-based scheme, as performed by the cryptographic logic 302, for example, may perform stateful hash processing. The cryptographic logic 302 may store two partial hashes (one transmit, one receive) per connection for network inbound packets or outbound packet schedules. In one example of stateful hash processing, each object may be serially transferred on a single connection.

In embodiments, the operating system may also include a file handler 334 to provide storage services for applications utilizing networked file-based storage, and a block handler 336 to provide storage services for applications 312 utilizing networked block-based storage. Block- and file-based storage generally has fine-grained, random accesses. For block storage, the minimum unit of storage is a disk sector, 4 KB, with legacy Hard Disk Drives (HDDs) having 512-byte sectors, for example. The minimum unit of file-based transfer is a host system page, predominantly 4 KB, sometimes higher. The storing of a message authentication code per disk sector creates an overhead of 64 bytes for each 4 KB sector. Enterprise/datacenter SSDs and HDDs may support storage of metadata per sector, for uses like T10 Dif (non-secure data integrity). Since both file and block-based storage is randomly accessible on a page (file) or sector (block) basis, MACs for such storage must be computed, stored and checked on a per page/sector basis, for a given write/store/read cycle. Enterprise/datacenter disks and SSDs and their access protocols (local and network) include additional per-sector storage space, labeled generically "metadata," for application-specific purposes. Enterprise/datacenter disks/SSDs typically offer 64B of metadata for each 4 KB sector. Embodiments discussed herein use such metadata space for storing each sector/page's MAC.

In embodiments, each of the object handler 332, the file handler 334, and block handler 336 may include a "shim," or "security shim" such as a component, module, software code, and so forth to tag individual IOP requests with memory region indices, based on the disk volume (block), filesystem (file) or bucket (object) targeted by the IOP requests. The memory region indices may be utilized by the RDMA logic 304 to determine security association context indices, and the cryptographic logic 302 uses the security association context indices to determine associated security association contexts. The cryptographic logic 302, using a security association context, applies encryption/decryption and authentication to data that is being read or written to the remote storage 303. More specifically, the cryptographic logic 302 may determine the security association context based on the security association context indices and determine a cryptographic protocol type for associated data, and a secret data key. The cryptographic logic 302 may use a starting nonce for the cryptographic algorithm used for encryption/decryption, as previously discussed from the RDMA logic 304. The RDMA logic 304 may append the security association context index to a DMA (or RDMA) request to memory, and the cryptographic logic 302 may intercept request. The cryptographic logic 302 may perform encryption/decryption and/or authentication operations based on the appended security association context index.

In embodiments, the client node 301 and the operating system 330 may include user space 310 to enable programs and applications not part of the kernel to run. For example, the user space 310 may include applications 312 which may be a program made up of code and operate to provide functionality to a user. An application 312 may be a group of functions, tasks, and activities to cause a device, such as a client node 301 to operate in a particular manner that is useful to a user. Examples of applications 312 include word processing application, a spreadsheet application, accounting application, an image application, web browser, media applications, games, and so forth. Embodiments are not limited to these examples of applications 312.

The operating system 330 may also provide key management functionality in user space 310. For example, the operating system 330 may include a key management component 314-1 to process and manage keys relating to encryption and decryption for user data. The operating system 330 may include another key management component 314-2 to process and manage keys relating to authentication for users. In some embodiments, key management for encryption/decryption and authentication may be provided by a single key management component, and embodiments are not limited in this manner.

The key management components 314-1 and 314-2 may be capable of providing key management functionality to a number of users that may be using the client node 301 at the same or different times. For example, the key management components 314-1 and 314-2 may perform key revocation and renewal in accordance with user/tenant policies. These renewed secret data keys are passed from the key management components 314-1 and 314-2 to the cryptographic logic 302 and stored by the cryptographic logic 302 in a secure memory/storage location, e.g. the security association context table. The secret data keys may be passed from key management software to cryptographic logic 302. The cryptographic logic 302 may return the index of the security association related to the user and/memory regions for the user's data. The object handler 332, file handler 334, and the block handler 336 may utilize the index to tag the IOPs as previously discussed. Thus, different users have different secret data keys to encrypt/decrypt and authenticate data in remote storage. The object handler 332, file handler 334, and the block hander 336 may process read/write requests for different user's utilizing their unique indices of the security association. Each user's data is processed in accordance with their particular security association context and secret data key to encrypt and decrypt data and sign data for remote storage.

Figure 3B:
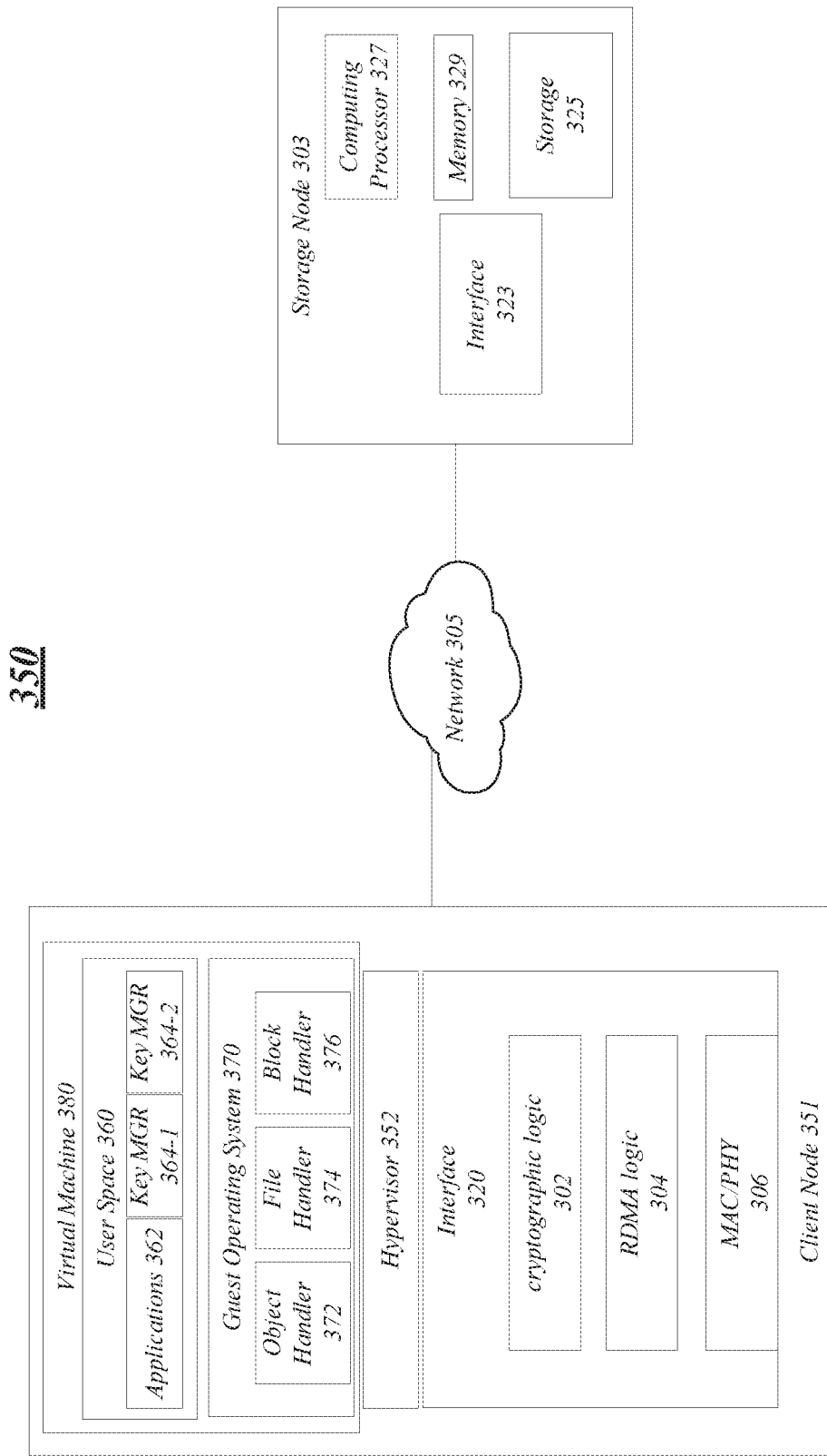
FIGS. 3A/3B illustrate examples of systems.

FIG. 3B illustrates an example operating environment 350 including a client node 351 coupled to a storage node 303 via a network 305. In the illustrated example, the client node 351 may utilize the storage node 303 to store data, e.g. cloud-based storage. Moreover, the operating environment 350 is a cloud-based environment capable of providing a number of computing services to users. In the illustrated example, the client node 351 may be one of many client nodes capable of providing storage and processing services to users.

In embodiments, the client node 351 may provide services to a number of users via virtualization. For example, the client node 351 may include a hypervisor 352 or virtual machine monitor (VMM) to provide virtual environments for users. For example, the hypervisor 352 may be utilized to generate one or more virtual machines, and each of the virtual machines may provide an environment for a user that is separated from other users and virtual machines. The hypervisor 352 may generate and provide the virtual machine having a guest operating system 370 to a virtual operating platform. The hypervisor 352 may manage each of the virtual machines and guest operating systems 370.

In embodiments, each of the guest operating systems 370 may include an object handler 372, a file handler 374, and block handler 376 to process read/write requests to remote storage, such as storage node 303, for one or more applications 362. As similarly discussed above, each of the object handler 372, the file handler 374, and block handler 376 in a guest operating system 370 may include a "shim," such as a component, module, software code, and so forth to tag individual TOP requests with memory region indicies, based on the disk volume (block), filesystem (file) or bucket (object) targeted by the TOP requests. In this example embodiment, a guest operating system 370 may directly post the TOP requests to the interface 320 hardware utilizing single root input/output virtualization (SR-IOV) or other mechanisms, for example, and bypass the hypervisor 352. A memory region index may be used to determine a security association index, which may be further used by the cryptographic logic 302 to determine an associated security association context. The cryptographic logic 302 utilizes the security association context and applies encryption/decryption and authentication to data that is being read or written to the remote storage. More specifically, the cryptographic logic 302 may determine the security association context based on the security association indices tagged in the TOP request and determine a cryptographic protocol type for associated data, and a secret data key to perform encryption/decryption, as previously discussed.

In embodiments, each of the virtual machines 380 include a guest a user space 360 having separate applications 362, key management components 364-1 and 364-2. A Virtual machine 380 includes a guest operating system 370 having an object handler 372, a file handler 374, and a block handler 376 along with additional components to support processing for the user and the user's applications 362. In embodiments, security shims in the Object Handler 372, File Handler 374, and Block Handler 376 within Guest Operating System 370 may associate their IOPs with a security association index, via the IOPs' RDMA memory regions. Supporting user-space utilities Key MGR 364-1 and Key 364-2 may offer key revocation and renewal services for encryption and/or authentication/integrity.

Figure 4A:
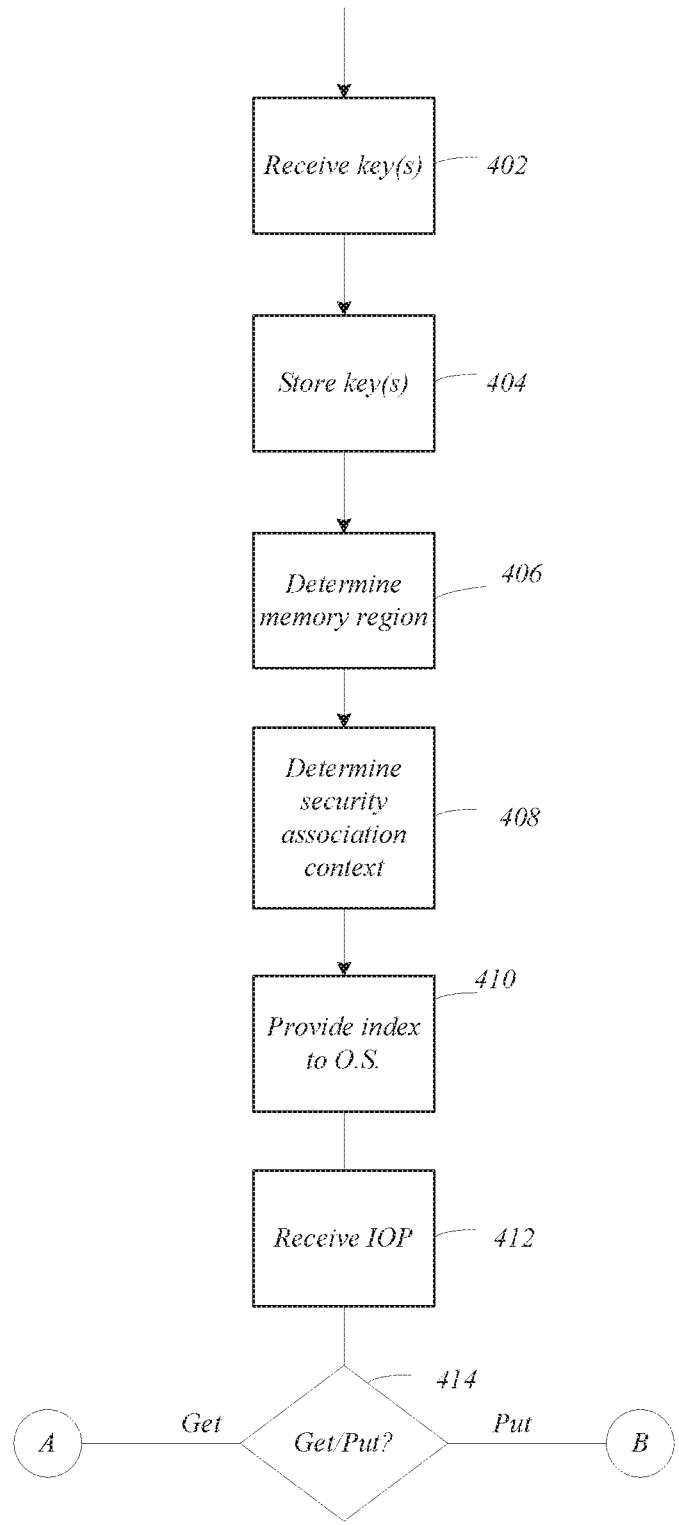
FIGS. 4A-4C illustrates an example of a first logic flow.
Figure 4B:
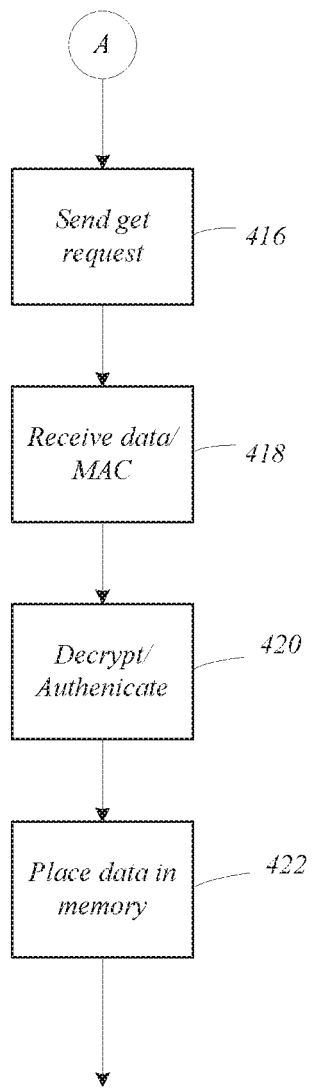
Figure 4C:
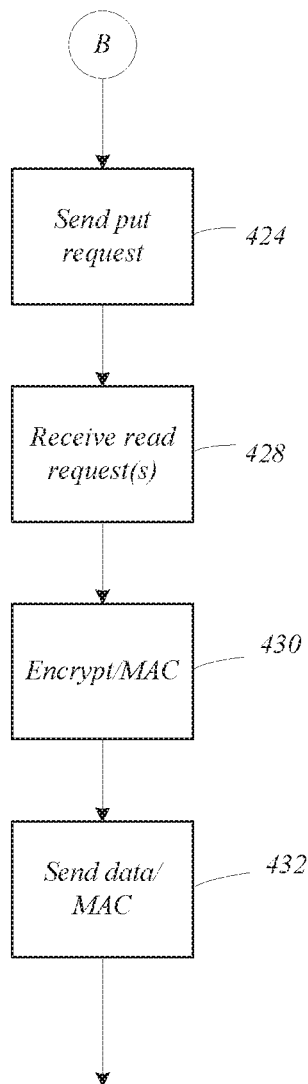

FIGS. 4A-4C illustrates an example of a first logic flow 400 that may be representative of some or all of the operations executed by one or more embodiments described herein. For example, the logic flow 400 may illustrate operations performed by a node, and in particular an interface, such as an RNIC including an RDMA logic and a cryptographic logic. However, embodiments are not limited in this manner.

At block 402, embodiments include receiving one or more keys to perform security operations for data stored remotely, e.g. on a remote storage node coupled via a network interconnect. The one or more keys may be used to encrypt/decrypt and/or perform authentication operations. Moreover, the keys may be received from an operating system and may be based on a credential provider by a user or other means, such as from a tenant's virtual machine's guest operating system. In one example, a user may enter a password via a user interface, for example, and the operating system may generate a secret data key that may be used to encrypt data for storage on the remote storage node and decrypt received from the remote storage node that is associated with the user. Embodiments include enabling different users to have different passwords and secret data keys. Thus, one user may not be able to decrypt data relating to another user.

At block 404, the logic flow 400 includes storing the one or more keys in a secure memory location. The secure memory location may be a table, e.g. a security association context table, or the like and stored in a memory of the interface or a secure region of host memory. Embodiments also include determining a memory region of host memory to utilize when processing IOPs relating to storage of a user's data at block 406. Different user's data may be allocated separate and secure memory regions to store data either for writing to the remote storage or data read from the remote storage.

At block 408, embodiments include determining a security association context for the memory region and associated with a particular user's data. More specifically, a memory region index is used to determine an entry in a memory region table including a security association context index, and other information. The security association context index is used to determine an entry in a security association context table and a security association context. The security association context may be a "recipe" used to encrypt/decrypt data and perform authentication for the data. For example, the security authentication context for a particular memory region associated with user's data may indicate a cryptographic protocol type for associated data used to encrypt/decrypt, and the secret data key used to encrypt or decrypt data. The security association context information is used with a starting nonce for the cryptographic algorithm to perform the encryption/decryption (for block storage, this may be the Logical Base Address of the data on disk).

At block 410, embodiments include send or indicating the memory region index value associated with a memory region for data to an operating system. In a bare-metal system, there may be a single operating system to receive the index, and in a virtualized environment a guest operating system for the particular user may receive the index value for the security association context. The operating system/guest operating system may include handlers that may use the memory region index to tag IOPs communicated to the interface to process remotely stored data using security features.

At block 412, embodiments include receiving an IOP, such as a transaction request, from an operating system/guest operating system. As mentioned, the IOP may include or be tagged with a memory region index used to identify a particular entry in a memory region table including a security association context index value further used to determine a security association context index value for data stored/read from a remote storage. At block 414, the logic flow 400 may include determining whether the IOP is a put (write transaction) to write data to a remote storage or a get (read transaction) to read data from a remote storage. If the IOP indicates that data is to be read from a remote storage, the logic flow 400 may continue in FIG. 4B at block 416.

At 416, the logic flow 400 may include fast registering a secure memory region of host memory to store the received data and posting a Get request to a remote storage node. The Get request may be an RDMA request and include a single, virtually addressed Scatter/Gather Element (SGE) pointing to the secure memory sink buffer, e.g. the secure memory region. The remote storage node may receive the Get request, parse the Get request, and determine the data (and MAC if authentication is used) to send back to the client node and interface.

At block 418, embodiments include receiving, by an interface, data, and MAC (if authentication is utilized). The data/MAC may be received from the remote storage node in one or more RDMA write messages. Each of the RDMA writes messages may include a portion of data, encrypted, requested by the client node. The interface may also receive a MAC value in an RDMA write a message if an authentication is being utilized. The MAC may be stored on the remote storage node as previously discussed above in FIG. 3A

At block 420, the logic flow 400 include decrypting and authenticating the data. The decrypted data (plaintext data) may be stored or sent to the host memory and provided to the operating system for use at block 422. To decrypt the data, the interface may utilize the security association context to determine a decryption method, and the secret data key. For example, RDMA logic identifies an entry in the memory region table based on the memory region index value in the request, and determine the security association context index value in the entry of the memory region table. The RDMA logic also determines the starting nonce in the memory region table entry. The RDMA logic may pass the security association context index value and the nonce to the cryptographic logic. The cryptographic logic further uses this information (security association context index value and the nonce) to determine the cryptographic type and the secret data key for the request. The cryptographic logic uses the information to perform a cryptographic operation. If authentication is utilized, the interface may authenticate the data prior to providing it to the host memory. To authenticate the data, the interface may generate a hash value based on the received and decrypted data and compare it to the hash value received from the remote storage. If the values match the data may be authenticated and if they do not match, the data may not be authenticated and may be discarded. An error may be generated if the data is not authenticated.

In embodiments, if the IOP indicates that data is to be written to remote storage, the logic flow 400 may continue in FIG. 4C at block 424. The logic flow 400, at block 424, includes sending a put request to a remote storage node from an interface. In some instances, the put request may be an RDMA Send command including an SGE pointing to a created secure memory region to store the data to be written to the remote storage node. The remote storage node may receive the put request, process the put request, and reply with one or more RDMA read requests to draw data down from the client node. The RDMA read request(s) may include or reference the SGE. At block 428, the interface and client node may receive the one or more RDMA read requests. Further and at block 430, the interface may encrypt and generate a MAC (or partial MAC) value for data to be sent to the remote storage node. For example, RDMA logic identifies an entry in the memory region table based on the memory region index value in the request, and determines the security association context index value in the entry of the memory region table. The RDMA logic also determines the starting nonce in the memory region table entry. The RDMA logic may pass the security association context index value and the nonce to the cryptographic logic. The cryptographic logic further uses this information (security association context index value and the nonce) to determine the cryptographic type and the secret data key for the request. The cryptographic logic uses the information to perform a cryptographic operation. The interface may send the data and MAC to the remote storage in RDMA read responses at block 432. In some instances, authentication may not be used, and a MAC may not be generated and sent to the remote storage node. FIGS. 5, and 6A-6C illustrate further examples of processing flows to read and write data to a remote storage node utilizing security operations.

Figure 5:
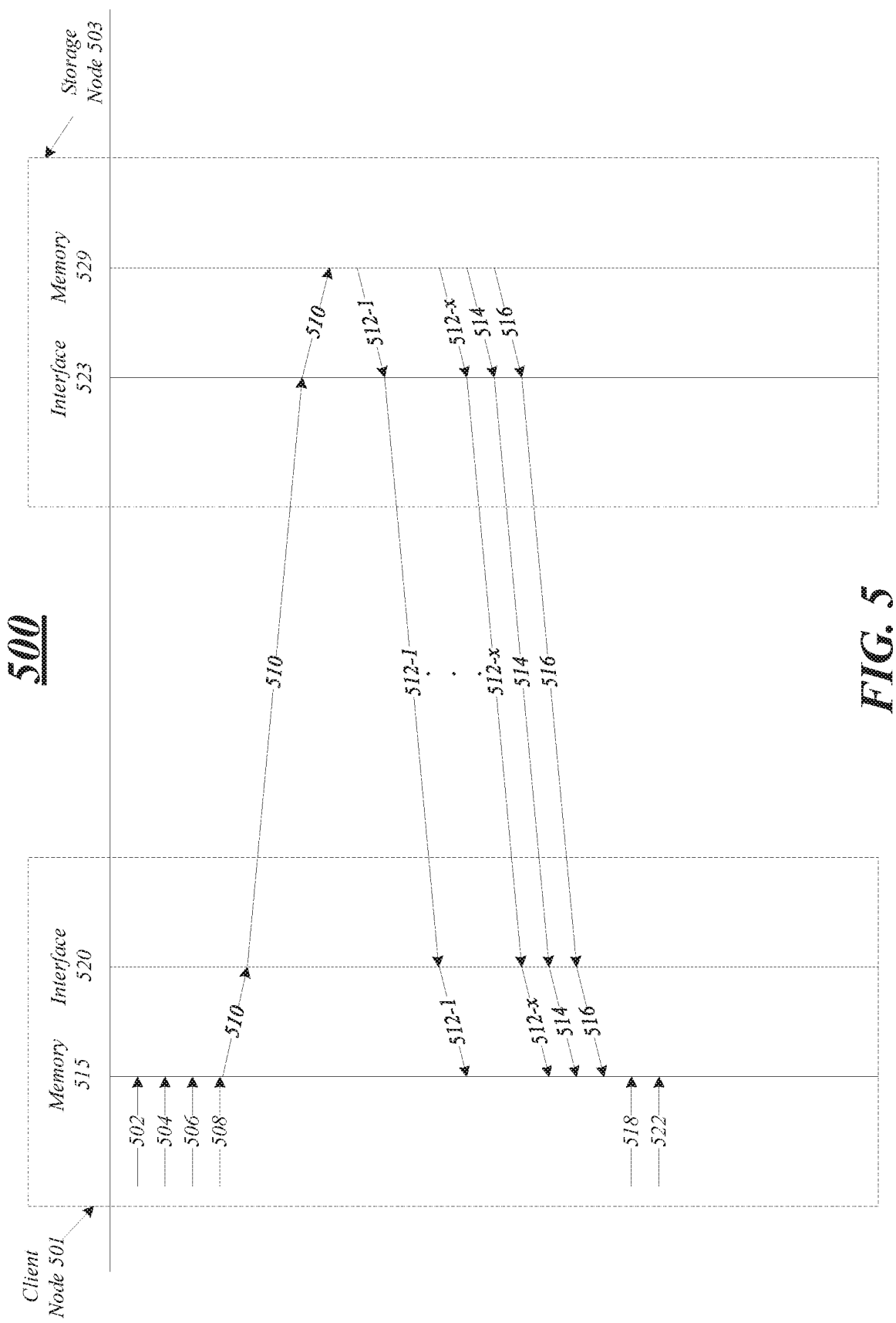
FIG. 5 illustrates an example of a processing flow to get data.

FIG. 5 illustrates an example processing flow 500 to retrieve data from a storage node 503 by a client node 501. In the illustrated example processing flow 500, the storage node 503 may be object based storage and may be storing data for the client node 501 as objects. The illustrated processing flow 500 may be for a 1 MB Get with encryption and authentication/integrity; however, embodiments are not limited in this manner. The Get IOP includes Get (Send/Receive), data (RDMA Write), and Completion (Send/Receive) Messages in the RDMA network. In this example, data is encrypted and securely signed, with a 64-byte MAC, on the target storage disk of the storage node 503, having been encrypted and signed earlier by the client node 501.

The processing flow 500 illustrates a number of communications and operations that are performed for each IOP of a 1 MB Get with encryption and authentication. For an IOP, the client node 501 may allocate 1 megabyte (MB) local pinned landing buffer in the object storage stack of memory 515 to receive the requested object from the storage node 503 at line 502. The client node 501 may create a queue pair (QP) and mark it as one supporting a secure memory region/secure memory window at line 504. The client node 501 may fast-register these pages for the 1 MB local pinned landing buffer as a single secure memory region of the memory 515 by posting a fast memory registration to the interface send queue at line 506. The secure memory region layout is defined as data stride of 1 MB and a 64-byte MAC. The client node 501 then posts a Get request to the storage node 503 at lines 508 and 510. The Get request may be an RDMA request and include a single, virtually addressed Scatter/Gather Element (SGE) pointing to the secure memory sink buffer in the client node's 501 memory 515.

At line 510, the storage node 503 including the storage node's 503 storage stack of memory 529 receives the Get request and parses the Get request. The storage node 503 may retrieve the data and MAC from local mass storage based on the Get request and information in the Get request. At lines 512-1 through 512-x, where x may be any positive integer and based on the size of the data, the storage node 503 may transfer Read data plus MAC to the Client using a single 1 MB+64-byte (B) RDMA Write Message as a number of packets, such as 2 kilobyte (KB) packets. The storage node may send the MAC in a single 64 B packet at line 514.

The client node 501 may receive the data and MAC at lines 512-1 through 512-x and 514 and stores per-QP, partial MAC work-in-progress computations between packets or outbound schedules. The received data may be fed to the cryptographic logic in order, precluding out-of-order iWarp data placement by the client nodes 501 interfaces. Further, when the client node's 501 interface receives each RDMA Write packet, the client node 501 including the RDMA logic uses information in the received RDMA Write packet headers, e.g., STag or R_Key, to look up an entry in the memory region table, determines a security association context index value. The security association context index value is used to look up a security association context in an entry in a security association context table. Embodiments include validating the security association context and extracting security association details from the security association context. The cryptographic logic may use the security association context and information passed from the RDMA logic, including the nonce to perform a cryptographic operation. The security association context calls for both decryption and authentication.

The client node 501 including the cryptographic logic performs decryption and authentication of the packet payload. For authentication, the cryptographic logic retrieves the partial MAC and updates it with the incoming data, e.g. MAC data at line 514. The cryptographic logic generates a MAC value of the object and compares it against that received from MAC in the packet from the storage node 503. If generated MAC value does not match the MAC value communicated from the storage node 503, the secure memory region context is colored, e.g. an error or miss occurs.

At line 516, the client node 501 receives the Get completion message and, at line 518 determines the status of the secure memory region associated with the data transfer, via an ib_check_mr_status( ) verb call, for example. If the secure memory region is colored, the Get is completed with a failure status. The explicit check status verb call is needed because the incoming RDMA Write may not generate a completion at the client node 501. At line 522, the client node 501 may close the IOP with a local invalidate (Local-Inv) posting that invalidates the secure memory region. In some instances, the storage node 503 may perform this invalidation by issuing a Send-with-Invalidate with its Completion Message at line 518.

Figure 6A:
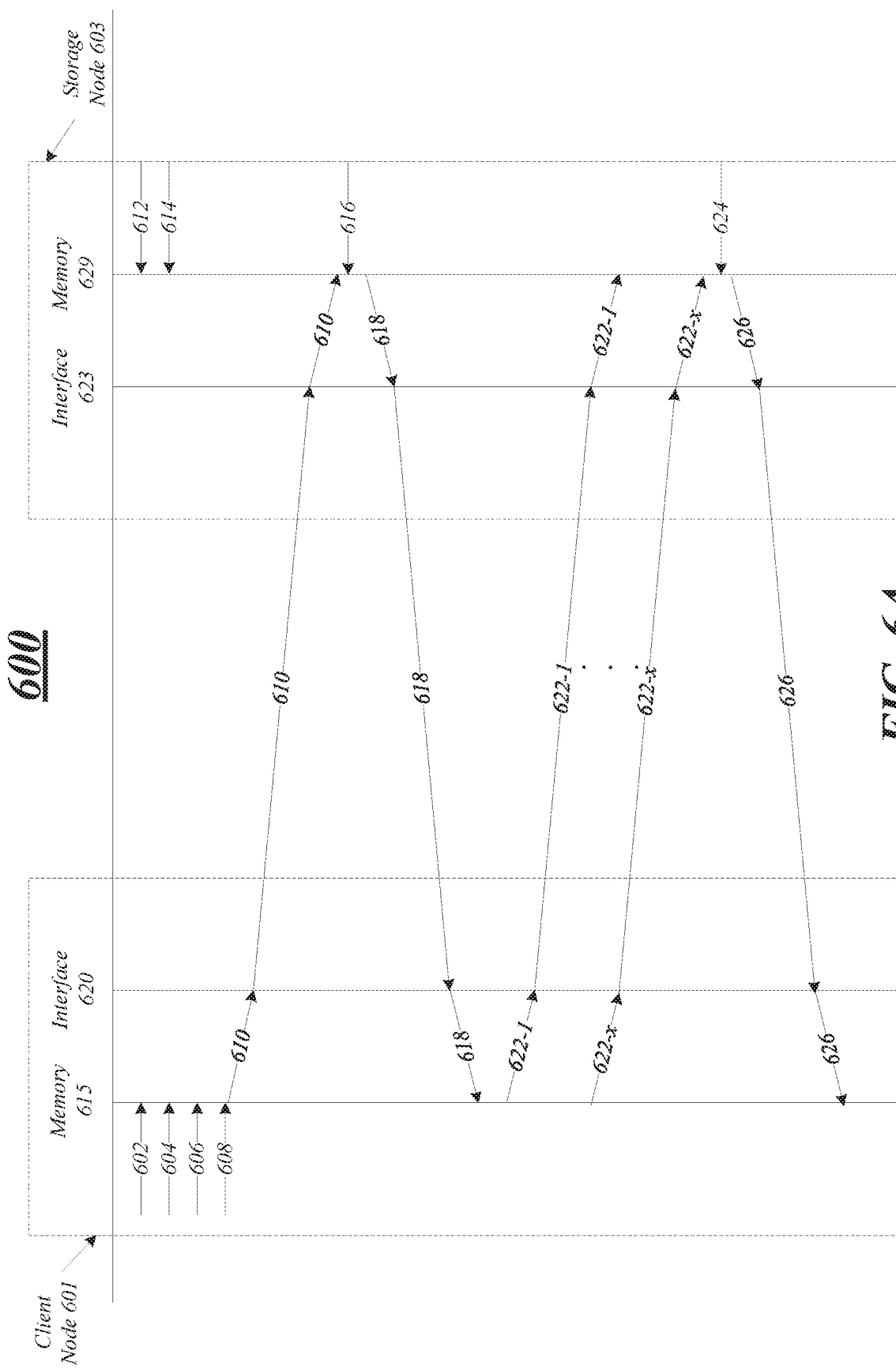

FIG. 6A illustrates an example processing flow 600 to perform a 16 KB non-volatile memory express over fabrics (NVMe-oF) sequential write to storage node 603 from the client node 601 with encryption only, no authentication. At line 602, the client node 601 may allocate a local pinned buffer in the storage stack of memory 615 to store data for sending to the storage node 603. The client node 601 may create a queue pair (QP) and mark it as one supporting a secure memory region/secure memory window at line 604. At line 606, the client node may fast register the 16 KB source buffer as a secure memory region which will subsequently cause encryption of the Write outbound data. For example, a cryptographic logic may determine a security association context associated with the secure memory region for the IOP associated with the data. In one example, the security association context may indicate that the data is to be encrypted utilizing XTS-AES, for example, have a starting nonce corresponding to the Write's Logical Base Address (LBA) on disk.

At line 608 a post send (PostSend) command may be issued and, at line 610 the client node 601 may issue a send/receive command to the storage node 603. The send/receive command may contain an address (SGE to point to the secure memory region) and extent of the secure memory region of memory 615. The storage node 603, requiring no security functionality, posts or creates a memory region as a receive buffer for the data at line 612 and creates a QP at line 614. Note that the memory region created and line 612 and the QP created at line 614 may occur prior to other operations performed by storage node 603.

Further and at line 616, the storage node 603 may parse the send/receive command and issue a post send (RDMA Read request) command to retrieve data from the client node 601. At line 618, the storage node 603 may issue a single RDMA Read request to draw data down from the client node 601. The RDMA Read request may reference or include the transferred SGE from the send/receive command at line 610. The client node 601 may validate the RDMA Read request from the storage node 603 and at lines 622-1 through 622-x, where x may be any positive integer, issue one or more RDMA Read responses with encrypted data. In one example, the network path maximum transmission unit (PMTU) may be 4 KB. Thus, in this example the corresponding RDMA Read response is divided into four, 4096-B (4 KB) ciphertext packets, each including encrypted data. For each of the RDMA Read responses, the interface 620 including the RDMA logic and the cryptographic logic may fetch plaintext data from memory 615. The RDMA logic may provide the encryption details based on a security association context associated with a secure memory region and an IOP to write the data. In one example, the cryptographic logic may encrypt the plaintext data utilizing the LBA nonce that the interface 620 increments by byte-count for each RDMA fetch quantum (the 16 KB of application data may be splayed across multiple physical buffers in memory 615.

The storage node 603 may receive each of the RDMA Read response including the encrypted data via interface 623 and write the data to memory 629. The data may then be written to storage, e.g. hard disks and/or SSDs and becomes secure data at rest. At line 624, the storage node 603 may issue a post send (PostSend) completion command and send an RDMA message 626 to the client node 601 to indicate completion. Since authentication is not used in this example, the client node 601 need not check the secure memory region status at the end of the TOP.

FIG. 6B illustrates an example processing flow 630 to perform a 16 KB NVMe-oF sequential write to storage node 603 from client node 601 with encryption, authentication, and stateful encryption processing. In this case, data passes through the cryptographic logic of interface 620 in order and generates a partial MAC value, each of which is communicated in different packets. In this example, the format of data on the network is a four-times repeated sequence of 4096 bytes (4 KB) utilizing XTS-AES-encryption, followed by a 64-byte MAC. In this case, the network MTU is 4 KB, so MACs are not aligned to packet boundaries, and the cryptographic logic must retain partial MAC calculations (values), per connection, between packets.

At line 632, the client node 601 may allocate a local pinned buffer in the storage stack of memory 615 to store data for sending to the storage node 603. The client node 601 may create a queue pair (QP) and mark it as one supporting a secure memory region/secure memory window at line 634. At line 636, the client node may fast register the 16 KB source buffer as a secure memory region which will subsequently cause encryption of the Write outbound data. For example, a cryptographic logic may determine a security association context associated with the secure memory region for the IOP associated with the data.

At line 638 a post send (PostSend) command may be issued and, at line 640 the client node 601 may issue a send/receive command to the storage node 603. The send/receive command may include SGE pointing to the secure memory region of the memory 615 to draw down the data. The storage node 603, requiring no security functionality, posts or creates a memory region as a receive buffer for the data at line 642 and creates a QP at line 644. Note that the memory region created and line 642 and the QP created at line 644 may occur prior to other operations performed by storage node 603.

Further and at line 646, the storage node 603 may parse the send/receive command and issue a post send (PostSend) command. At line 648, the storage node 603 may issue a single RDMA Read request to draw data down the data from the client node 601. The RDMA Read request may reference or include the transferred SGE from the send/receive command at line 640. The client node 601 may validate the RDMA Read request from the storage node 603 and at lines 650-1 through 650-z, where z may be any positive integer, issue one or more RDMA Read responses with encrypted data. In this example, authentication may be utilized, and MAC (hash) values may be communicated with the encrypted data. The client node 601 may send a first packet (RDMA Read response) including only encrypted data at line 650-1. All subsequent packets (RDMA Read responses) may include a MAC (hash) value based on the previous data transmitted. For example, a second packet may be communicated with encrypted data and include a MAC value based on the encrypted data communicated in the first packet at line 650-1, for example. The network path maximum transmission unit (PMTU) may be 4 KB, as previously discussed. Thus, in this example the corresponding RDMA Read response is divided into four, 4096-B (4 KB) ciphertext packets, the first packet including encrypted data only and the subsequent packet including encrypted data and a MAC value. At line 652, fifth packet (RDMA Read response) may be communicated that includes the remaining encrypted data and final MAC value. The fifth packet may be 256 bytes in this example.

For each of the RDMA Read responses, the interface 620 including the RDMA logic and the cryptographic logic may fetch plaintext data from the memory 615. The RDMA logic may provide a security association context index value to cryptographic logic to determine a security association context associated with a secure memory region and an IOP to write the data. In one example, the cryptographic logic may encrypt the plaintext data utilizing the LBA nonce that the interface 620 increments by byte-count for each RDMA fetch quantum (the 16 KB of application data may be splayed across multiple physical buffers in memory 615. The cryptographic logic may also generate a partial MAC value and store the partial MAC value in a stateful manner to communicate in a next packet.

The storage node 603 may receive each of the RDMA Read response including the encrypted data via interface 623 and write the data to memory 629. The data may be stored in the storage, such as HDD and/or SSD and become secure data at rest. At line 654, the storage node 603 may issue a post send (PostSend) completion command and send an RDMA message 656 to the client node 601 to indicate completion. At line 658 the client node 601 may determine the status of the secure memory region and issue a local invalidation or validation post.

FIG. 6C illustrates an example processing flow 660 to perform a 16 KB NVMe-oF sequential write to storage node 603 from client node 601 with encryption, authentication, and out-of-order/stateless cryptographic processing. In some embodiments, the cryptographic logic may not be capable of storing partial MAC values per connection, or out of order data reception is required. In these instances, the 16 KB Write IOP is split into four, 4 KB+ RDMA Read requests (678-1 through 678-*a*) at the storage node 603. The MAC values may be aligned to packet boundaries, and as such, the cryptographic logic may not need to store partial MAC values between transmitting schedules of a given QP.

At line 662, the client node 601 may allocate a local pinned buffer in the storage stack of memory 615 to store data for sending to the storage node 603. The client node 601 may create a queue pair (QP) and mark it as one supporting a secure memory region/secure memory window at line 664. At line 666, the client node may fast register the 16 KB source buffer as a secure memory region and cause encryption of the Write outbound data. For example, a cryptographic logic may determine a security association context associated with the secure memory region for the IOP associated with the data.

At line 668 a post send (PostSend) command may be issued and, at line 670 the client node 601 may issue a send/receive command to the storage node 603. The send/receive command may include SGE pointing to the secure memory region of the memory 615 to draw down the data. The storage node 603, requiring no security functionality, posts or creates a memory region as a receive buffer for the data at line 672 and creates a QP at line 674. Note that the memory region created and line 672 and the QP created at line 674 may occur prior to other operations performed by storage node 603.

Further and at line 676, the storage node 603 may parse the send/receive command to issue a post send (PostSend) command. As mentioned, the storage node 603 may issue a number of RDMA Read request to draw down data from the client node 601 at lines 678-1 through 678-*a*, where a may be any positive integer. Each of the RDMA Read requests may reference or include the transferred SGE from the RDMA Write command at line 670. The client node 601 may validate the RDMA Read requests from the storage node 603 and at lines 680-1 through 680-b, where b may be any positive integer, issue one or more RDMA Read responses with encrypted data and aligned MAC values. In this example, authentication may be utilized, and partial MAC (hash) values may be communicated with the encrypted data.

For each of the RDMA Read responses, the interface 620 including the RDMA logic and the cryptographic logic may fetch plaintext data from the memory 615. The RDMA logic may provide the encryption details based on a security association context associated with a secure memory region and an TOP to write the data. In one example, the cryptographic logic may encrypt the plaintext data utilizing the LBA nonce that the interface 620 increments by byte-count for each RDMA fetch quantum, the 16 KB of application data may be splayed across multiple physical buffers in memory 615.

The storage node 603 may receive each of the RDMA Read responses including the encrypted data and MAC values via interface 626 and write the data to memory 629. The data may be stored in the storage, e.g. HDD and/or SSD, and become secure data at rest. At line 682, the storage node 603 may issue a post send (PostSend) completion command and a send an RDMA message 684 to the client node 601 to indicate completion. At line 686 the client node 601 may determine the status of the secure memory region and issue a local invalidation or validation post.

FIG. 7 illustrates an example of a first logic flow 700 that may be representative of some or all of the operations executed by one or more embodiments described herein. For example, the logic flow 700 may illustrate operations performed by a node, as described herein.

At block 705, the logic flow 700 may include determining a secure memory region for a transaction, the secure memory region associated with a security association context to perform one or more of an encryption/decryption operation and an authentication operation for the transaction. The security association context may include information to encrypt/decrypt and perform authentication for the cryptographic logic.

At block 710, the logic flow 700 includes performing one or more of the encryption/decryption operation and the authentication operation for the transaction based on the security association context. In embodiments, the encryption/decryption operation and the authentication operation may be performed at the client-side, e.g. a client node, and may be based on the type of transaction. For example, a write (put) transaction may require encrypting information in one or more packets based on the security association context. A MAC or partial MAC may also be created for the information for storage on a remote device if authentication is being utilized. In another example, a read (get) transaction may require decryption of information received from a remote storage based on the security association context. Further, authentication on the information may be perform utilizing MAC information received with the information.

At block 715, embodiments may include causing communication of the transaction. For example, if the transaction is a write transaction, information may be communicated to a remote storage node for storage. In another example, if the transaction is a read transaction, the information may be provided to other elements of the client node, such as memory for use by an application requesting the information. The transaction may not be performed until the encryption/decryption operation and/or the authentication operation have successfully completed.

Figure 8:
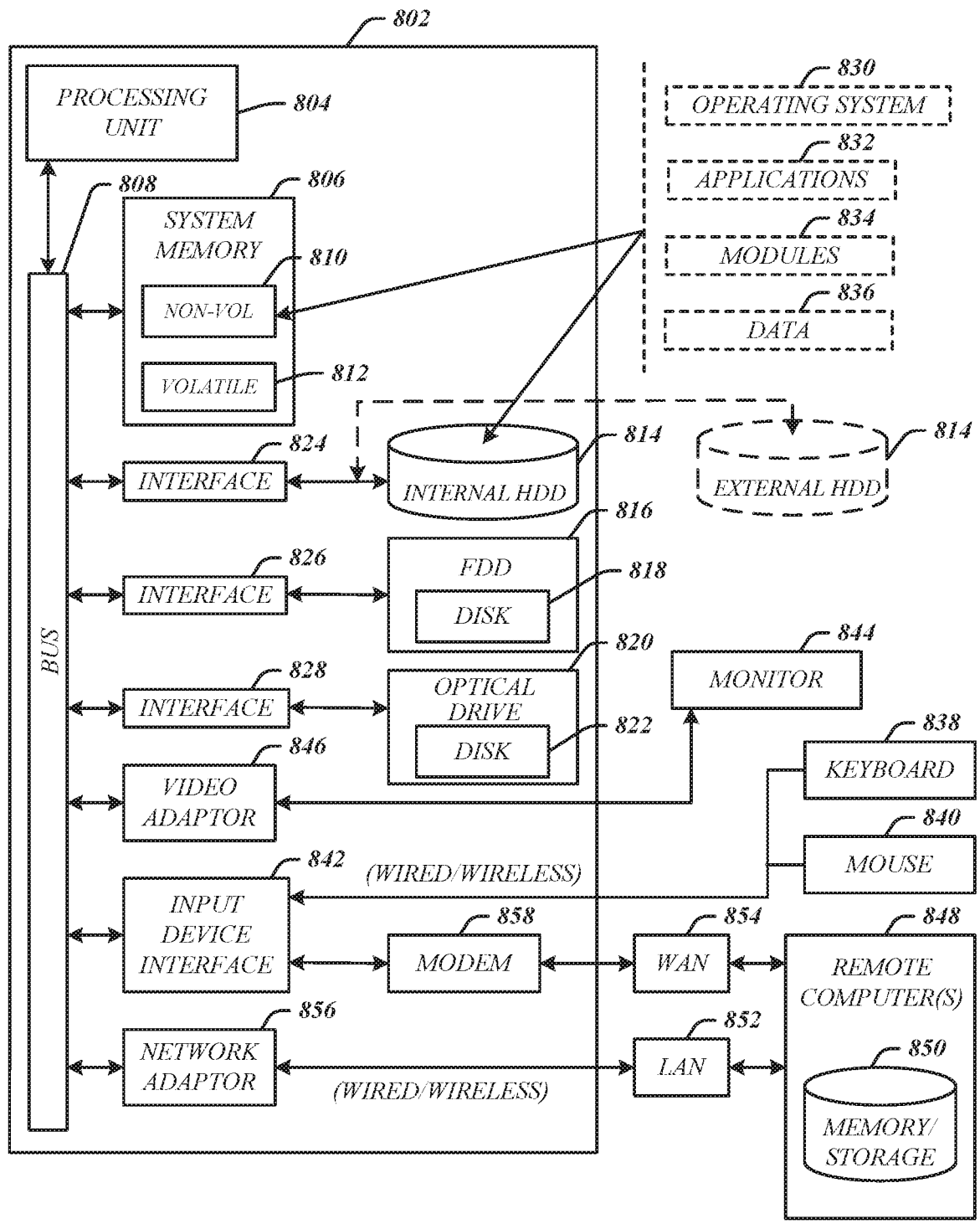
FIG. 8 illustrates an example embodiment of a computing architecture.

FIG. 8 illustrates an embodiment of an exemplary computing architecture 800 suitable for implementing various embodiments as previously described. In embodiments, the computing architecture 800 may include or be implemented as part of a node, for example.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and thread of execution, and a component can be localized on one computer and distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes a processing unit 804, a system memory 806 and a system bus 808. The processing unit 804 can be any of various commercially available processors.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by an HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and components of the system 700.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and larger networks, for example, a wide area network (WAN) 854. Such LAN and WAN networking environments are commonplace in offices and companies and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-8 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through thirty-three provided below are intended to be exemplary and non-limiting.

In a first example, a system, a device, an apparatus, and so forth may include interface circuitry to execute one or more instruction, the one or more instructions, that when executed, cause the interface circuitry to determine a secure memory region for a transaction, the secure memory region associated with a security association context to perform one or more of an encryption/decryption operation and an authentication operation for the transaction, perform one or more of the encryption/decryption operation and the authentication operation for the transaction based on the security association context, and cause communication of the transaction.

In a second example and in furtherance of the first example, a system, a device, an apparatus, and so forth to process the transaction comprising one of a write transaction to put data in a remote storage and a read transaction to get data from the remote storage, the remote storage coupled via network interconnect.

In a third example and in furtherance of any previous example, a system, a device, an apparatus, and so forth to include the interface circuitry to determine the transaction is a read transaction to get encrypted data from a remote storage coupled via a network interconnect, receive the encrypted data via the network interconnect, perform the encryption/decryption operation using information from the security association context to decrypt the encrypted data generating plaintext data, and provide the plaintext data to a local memory.

In a fourth example and in furtherance of any previous example, a system, a device, an apparatus, and so forth to include the interface circuitry to determine the transaction is a write transaction to put data in a remote storage coupled via a network interconnect, perform the encryption/decryption operation using information from the security association context to encrypt the data generating encrypted data, and cause communication of the encrypted data to the remote storage.

In a fifth example and in furtherance of any previous example, a system, a device, an apparatus, and so forth to include the interface circuitry to generate a message authentication code based on the plaintext data, compare the message authentication code with another message authentication code received from the remote storage, authenticate the plaintext data if the message authentication code matches the other message authentication code, and invalidate the plaintext data if the message authentication code does not match the other message authentication code.

In a sixth example and in furtherance of any previous example, a system, a device, an apparatus, and so forth to include the interface circuitry to generate a message authentication code based on the data, and cause communication of the message authentication code to the remote storage.

In a seventh example and in furtherance of any previous example, a system, a device, an apparatus, and so forth to include the interface circuitry to receive a transaction request and a memory region index value from an operating system to perform the transaction, the memory region index value associated with an entry in an memory region table, the entry comprising a security association context index to determine an entry in a security association context table specifying the security association context.

In an eighth example and in furtherance of any previous example, a system, a device, an apparatus, and so forth to include the interface circuitry to process the security association context comprising cryptographic protocol information, secure key information, and starting nonce information.

In a ninth example and in furtherance of any previous example, a system, a device, an apparatus, and so forth comprising a memory to store the one or more instructions, and a network interface component including the interface circuitry, the network interface component coupled with a remote storage via a network interconnect.

In a tenth example and in furtherance of any previous example, embodiments may include a computer-implemented method including determining a secure memory region for a transaction, the secure memory region associated with a security association context to perform one or more of an encryption/decryption operation and an authentication operation for the transaction, performing one or more of the encryption/decryption operation and the authentication operation for the transaction based on the security association context, and causing communication of the transaction.

In an eleventh example and in furtherance of any previous example, embodiments may include a computer-implemented method including processing the transaction comprising one of a write transaction to put data in a remote storage and a read transaction to get data from the remote storage, the remote storage coupled via a network interconnect.

In a twelfth example and in furtherance of any previous example, embodiments may include a computer-implemented method including determining the transaction is a read transaction to get encrypted data from a remote storage coupled via a network interconnect, receiving the encrypted data via the network interconnect, performing the encryption/decryption operation using information from the security association context to decrypt the encrypted data generating plaintext data, and providing the plaintext data to a local memory.

In a thirteenth example and in furtherance of any previous example, embodiments may include a computer-implemented method including determining the transaction is a write transaction to put data in a remote storage coupled via a network interconnect, performing the encryption/decryption operation using information from the security association context to encrypt the data generating encrypted data, and cause communication of the encrypted data to the remote storage.

In a fourteenth example and in furtherance of any previous example, embodiments may include a computer-implemented method including generating a message authentication code based on the plaintext data, comparing the message authentication code with another message authentication code received from the remote storage, authenticating the plaintext data if the message authentication code matches the other message authentication code, and invalidating the plaintext data if the message authentication code does not match the other message authentication code.

In a fifteenth example and in furtherance of any previous example, embodiments may include a computer-implemented method including generating a message authentication code based on the data, and causing communication of the message authentication code to the remote storage.

In a sixteenth example and in furtherance of any previous example, embodiments may include a computer-implemented method receiving a transaction request and a memory region index value from an operating system to perform the transaction, the memory region index value associated with an entry in an memory region table, the entry comprising a security association context index to determine an entry in a security association context table specifying the security association context.

In a seventeenth example and in furtherance of any previous example, embodiments may include a computer-implemented method including processing the security association context comprising cryptographic protocol information, secure key information, and starting nonce information.

In an eighteenth example and in furtherance of any previous example, embodiments include a non-transitory computer-readable storage medium, comprising a plurality of instructions, that when executed, enable processing circuitry to determine a secure memory region for a transaction, the secure memory region associated with a security association context to perform one or more of an encryption/decryption operation and an authentication operation for the transaction, perform one or more of the encryption/decryption operation and the authentication operation for the transaction based on the security association context, and cause communication of the transaction.

In a nineteenth example and in furtherance of any previous example, embodiments include a non-transitory computer-readable storage medium, comprising a plurality of instructions, that when executed, enable processing circuitry to processing the transaction comprising one of a write transaction to put data in a remote storage and a read transaction to get data from the remote storage, the remote storage coupled via network interconnect.

In a twentieth example and in furtherance of any previous example, embodiments include a non-transitory computer-readable storage medium, comprising a plurality of instructions, that when executed, enable processing circuitry to determine the transaction is a read transaction to get encrypted data from a remote storage coupled via a network interconnect, receive the encrypted data via the network interconnect, perform the encryption/decryption operation using information from the security association context to decrypt the encrypted data generating plaintext data, and provide the plaintext data to a local memory.

In a twenty-first example and in furtherance of any previous example, embodiments include a non-transitory computer-readable storage medium, comprising a plurality of instructions, that when executed, enable processing circuitry to determine the transaction is a write transaction to put data in a remote storage coupled via a network interconnect, perform the encryption/decryption operation using information from the security association context to encrypt the data generating encrypted data, and cause communication of the encrypted data to the remote storage.

In a twenty-second example and in furtherance of any previous example, embodiments include a non-transitory computer-readable storage medium, comprising a plurality of instructions, that when executed, enable processing circuitry to generate a message authentication code based on the plaintext data, compare the message authentication code with another message authentication code received from the remote storage, authenticate the plaintext data if the message authentication code matches the other message authentication code, and invalidate the plaintext data if the message authentication code does not match the other message authentication code.

In a twenty-third example and in furtherance of any previous example, embodiments include a non-transitory computer-readable storage medium, comprising a plurality of instructions, that when executed, enable processing circuitry to generate a message authentication code based on the data, and cause communication of the message authentication code to the remote storage.

In a twenty-fourth example and in furtherance of any previous example, embodiments include a non-transitory computer-readable storage medium, comprising a plurality of instructions, that when executed, enable processing circuitry to receive a transaction request and a memory region index value from an operating system to perform the transaction, the memory region index value associated with an entry in an memory region table, the entry comprising a security association context index to determine an entry in a security association context table specifying the security association context.

In a twenty-fifth example and in furtherance of any previous example, embodiments include a non-transitory computer-readable storage medium, comprising a plurality of instructions, that when executed, enable processing circuitry to process the security association context comprising cryptographic protocol information, secure key information, and starting nonce information.

In a twenty-sixth example and in furtherance of any previous example, a system, a device, an apparatus, and so forth to include means for determining a secure memory region for a transaction, the secure memory region associated with a security association context to perform one or more of an encryption/decryption operation and an authentication operation for the transaction, means for performing one or more of the encryption/decryption operation and the authentication operation for the transaction based on the security association context, and means for causing communication of the transaction.

In a twenty-seventh example and in furtherance of any previous example, a system, a device, an apparatus, and so forth to include means for processing the transaction comprising one of a write transaction to put data in a remote storage and a read transaction to get data from the remote storage, the remote storage coupled via a network interconnect.

In a twenty-eighth example and in furtherance of any previous example, a system, a device, an apparatus, and so forth to include means for determining the transaction is a read transaction to get encrypted data from a remote storage coupled via a network interconnect, means for receiving the encrypted data via the network interconnect, means for performing the encryption/decryption operation using information from the security association context to decrypt the encrypted data generating plaintext data, and means for providing the plaintext data to a local memory.

In a twenty-ninth example and in furtherance of any previous example, a system, a device, an apparatus, and so forth to include means for determining the transaction is a write transaction to put data in a remote storage coupled via a network interconnect, means for performing the encryption/decryption operation using information from the security association context to encrypt the data generating encrypted data, and means for causing communication of the encrypted data to the remote storage.

In a thirtieth example and in furtherance of any previous example, a system, a device, an apparatus, and so forth to include means for generating a message authentication code based on the plaintext data, means for comparing the message authentication code with another message authentication code received from the remote storage, means for authenticating the plaintext data if the message authentication code matches the other message authentication code, and means for invalidating the plaintext data if the message authentication code does not match the other message authentication code.

In a thirty-first example and in furtherance of any previous example, a system, a device, an apparatus, and so forth to include means for generating a message authentication code based on the data, and means for causing communication of the message authentication code to the remote storage.

In a thirty-second example and in furtherance of any previous example, a system, a device, an apparatus, and so forth to include means for receiving a transaction request and a memory region index value from an operating system to perform the transaction, the memory region index value associated with an entry in an memory region table, the entry comprising a security association context index to determine an entry in a security association context table specifying the security association context.

In a thirty-third example and in furtherance of any previous example, a system, a device, an apparatus, and so forth to include means to process the security association context comprising cryptographic protocol information, secure key information, and starting nonce information.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   network interface circuitry to execute one or more instructions, the one or more instructions, that when executed, cause the circuitry to:
   receive, from an operating system or an application, a request to comprise a remote direct memory access (RDMA) transaction and an index value;
   determine the RDMA transaction is a write transaction to put data in a remote storage via a network interconnect;
   determine a key based on the index value;
   generate authentication information based on the data and the key; and
   cause communication of the data and the authentication information to the remote storage in one or more RDMA messages via the network interconnect.

2. The apparatus of claim 1, the circuitry to:
   encrypt the data using an encryption key to generate encrypted data, wherein the encrypted data is to be communicated with the authentication information in the one or more RDMA messages.

3. The apparatus of claim 2, wherein the key and the encryption key are to be associated with a secure memory region for the RDMA transaction.

4. The apparatus of claim 3, the circuitry to:
   determine a nonce associated with the secure memory region; and
   perform the encryption based at least in part on the nonce.

5. The apparatus of claim 1, the authentication information to comprise one or more of a message authentication code (MAC), a signature, or a hash value.

6. The apparatus of claim 1, the circuitry to:
   receive requested data from the remote storage via the network interconnect;
   generate a second authentication information based on the requested data and the key;
   compare the second authentication information with a third authentication information received from the remote storage;

authenticate the requested data if the second authentication information matches the third authentication information; and invalidate the requested data if the second authentication information does not match the third authentication information.

7. The apparatus of claim 1, the circuitry to:

encrypt the data using the key to generate encrypted data, wherein the encrypted data is to be communicated with the authentication information in the one or more RDMA messages.

8. A non-transitory computer-readable storage medium comprising instructions, that when executed, enable processing circuitry to:

receive, from an operating system or an application, a request to comprise a remote direct memory access (RDMA) transaction and an index value;

determine the RDMA transaction is a write transaction to put data in a remote storage via a network interconnect;

determine a key based on the index value;

generate authentication information based on the data and the key; and cause communication of the data and the authentication information to the remote storage in one or more RDMA messages via the network interconnect.

9. The medium of claim 8, comprising instructions that when executed cause the processing circuitry to:

encrypt the data using an encryption key to generate encrypted data, wherein the encrypted data is to be communicated with the authentication information in the one or more RDMA messages.

10. The medium of claim 9, wherein the key and the encryption key are to be associated with a secure memory region for the RDMA transaction.

11. The medium of claim 10, comprising instructions that when executed cause the processing circuitry to:

determine a nonce associated with the secure memory region; and perform the encryption based at least in part on the nonce.

12. The medium of claim 8, the authentication information to comprise one or more of a message authentication code (MAC), a signature, or a hash value.

13. The medium of claim 8, comprising instructions that when executed cause the processing circuitry to:

receive requested data from the remote storage via the network interconnect;

generate a second authentication information based on the requested data and the key;

compare the second authentication information with a third authentication information received from the remote storage;

authenticate the requested data if the second authentication information matches the third authentication information; and invalidate the requested data if the second authentication information does not match the third authentication information.

14. The medium of claim 8, comprising instructions that when executed cause the processing circuitry to:

encrypt the data using the key to generate encrypted data, wherein the encrypted data is to be communicated with the authentication information in the one or more RDMA messages.

15. A computer-implemented method, comprising:

receiving, from an operating system or an application, a request to comprise a remote direct memory access (RDMA) transaction and an index value;

determining the RDMA transaction is a write transaction to put data in a remote storage via a network interconnect;

determining a key based on the index value;

generating authentication information based on the data and the key; and causing communication of the data and the authentication information to the remote storage in one or more RDMA messages via the network interconnect.

16. The method of claim 15, further comprising:

encrypting the data using an encryption key to generate encrypted data, wherein the encrypted data is to be communicated with the authentication information in the one or more RDMA messages.

17. The method of claim 16, wherein the key and the encryption key are to be associated with a secure memory region for the RDMA transaction.

18. The method of claim 17, further comprising:

determining a nonce associated with the secure memory region; and performing the encryption based at least in part on the nonce.

19. The method of claim 15, the authentication information to comprise one or more of a message authentication code (MAC), a signature, or a hash value.

20. The method of claim 15, further comprising:

encrypting the data using the key to generate encrypted data, wherein the encrypted data is to be communicated with the authentication information in the one or more RDMA messages.

\* \* \* \* \*